(12) United States Patent
Navarro et al.

(10) Patent No.: US 9,507,053 B2
(45) Date of Patent: Nov. 29, 2016

(54) USING AIRCRAFT TRAJECTORY DATA TO INFER ATMOSPHERIC CONDITIONS

(71) Applicant: The Boeing Company, Chicago, IL (US)

(72) Inventors: Francisco A. Navarro, Madrid (ES); Eduardo Gallo, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 381 days.

(21) Appl. No.: 14/105,766

(22) Filed: Dec. 13, 2013

(65) Prior Publication Data

US 2014/0172301 A1    Jun. 19, 2014

(30) Foreign Application Priority Data

Dec. 14, 2012    (EP) .................................. 12382505

(51) Int. Cl.
*G01W 1/00*    (2006.01)

(52) U.S. Cl.
CPC ...................................... *G01W 1/00* (2013.01)

(58) Field of Classification Search
CPC ............... G01J 2005/0048; G01J 2005/0077; G01J 5/20; G01J 5/522; G01J 1/08; G01J 1/42; G01J 2005/0081; G01S 13/723; G01S 13/765; G01S 13/767; G01S 13/78; G01S 13/784; G01S 13/86; G01S 13/867; G01W 1/06

See application file for complete search history.

(56) References Cited

U.S. PATENT DOCUMENTS

| 6,741,203 | B1* | 5/2004 | Woodell | .................... G01S 5/02 342/120 |
| 6,937,937 | B1 | 8/2005 | Manfred et al. | |
| 8,332,084 | B1 | 12/2012 | Bailey et al. | |
| 2004/0078136 | A1* | 4/2004 | Cornell | ................ G08G 5/0034 701/120 |
| 2008/0243319 | A1 | 10/2008 | Coulmeau et al. | |
| 2009/0012663 | A1 | 1/2009 | Mead et al. | |
| 2012/0083946 | A1 | 4/2012 | Maldonado | |

FOREIGN PATENT DOCUMENTS

| EP | 2040137 | 3/2009 |
| WO | 2008115724 A1 | 9/2008 |
| WO | 2009042405 | 4/2009 |

OTHER PUBLICATIONS

Gallo, Navarro et al. Advanced Aircraft Performance Modeling for ATM: BADA 4.0 Oct. 15, 2006, 25$^{th}$ Digital Avionics Systems Conference.*

(Continued)

*Primary Examiner* — Roy Y Yi

(57) ABSTRACT

The present disclosure relates to a method of inferring data relating to atmospheric conditions within an airspace of interest using observations of aircraft trajectories. Information relating to aircraft intent may also be inferred. Aircraft flying within the airspace are identified, and their trajectories and aircraft type are determined. Aircraft performance data relating to that type of aircraft is retrieved from memory, along with any filed aircraft intent data. Then, the atmospheric conditions data and, optionally, any missing aircraft intent data that, in combination with the filed aircraft intent data and the aircraft performance data, would give rise to the determined trajectory for each processed aircraft are inferred. The atmospheric data and optionally the missing aircraft intent data are provided as an output.

20 Claims, 6 Drawing Sheets

(56) References Cited

OTHER PUBLICATIONS

Gallo, Lopez-Leones et al. Trajectory Computation Infrastracutre Based on BADA Aircraft Performance Model Oct. 21, 2007, 26$^{th}$ Digital Avionics Systems Conference.*

European Patent Office, Extended European Search Report for Application No. 12382196.9-2206, dated Nov. 12, 2012, 9 pages.

Lopez-Leones, Javier, et al., "The Aircraft Intent Description Language: A key enabler for air-ground synchronization in Trajectory-Based Operations" Digital Avionics Systems Conference, 2007, 12 pages.

Marie-Dominique Dupuy, et al., "Preliminary results for a robust trajectory prediction method using advanced flight data", Digital Avionics Systems Conference, 2007, 9 pages.

Vilaplana, et al., "Towards a Formal Language for the Common Description of Aircraft Intent"; Proceedings of the 24th Digital Avionics Systems Conference, Washington DC, USA, Oct. 2005. Published by the Institute of Electrical and Electronic Engineers, Inc (IEEE), 9 pages.

European Search Report, dated Jan. 21, 2014; Applicant: The Boeing Company; Application No. 12382505.1-1555; 5 pages.

* cited by examiner

USING AIRCRAFT TRAJECTORY DATA TO INFER ATMOSPHERIC CONDITIONS

PRIORITY STATEMENT

This application claims the benefit of co-pending EP Patent Application No. 12382505.1, filed on Dec. 14, 2012, in the Spanish Patent Office, the disclosure of which is incorporated herein by reference in its entirety.

FIELD

The present disclosure relates to a method of inferring data relating to atmospheric conditions within an airspace of interest using observations of aircraft trajectories.

Information relating to aircraft intent may also be either provided at the same time, for example to improve the accuracy of inferred atmospheric data, or inferred along with the atmospheric data given that enough information is contained in the available aircraft trajectory observations. For inferring atmospheric conditions, this allows an estimation of wind and other atmospheric properties, such as pressure and temperature, that are useful for managing air vehicle operations within a given airspace volume. For inferring aircraft intent, the inferred intent may be used for predicting the future trajectory of the aircraft or for use in conflict resolution within air traffic management.

BACKGROUND

The availability of accurate and up to date data regarding atmospheric conditions is of great importance to aircraft. In particular, it is of paramount importance to aircraft flying within terminal maneuvering areas, i.e. the areas around airports where safe passage to and from runways must be guaranteed in ever increasingly difficult conditions associated with highly dense convergences of maneuvering traffic.

Existing solutions for predicting wind and other atmospheric properties within a given airspace and time period are derived from meteorological models, traditionally developed by meteorologists. Such models typically rely on obtaining a computational solution of a more or less sophisticated computational fluid dynamics formulation of the atmospheric physics. An alternative approach relies on exploiting large amounts of observed atmospheric data to fit some sort of mathematical or statistical model to account for the atmospheric physics. As computing power grows, research efforts have shifted to approaches that rely on solid, physically-founded formulations such as those used in computational fluid dynamics, but that can incorporate real observations collected as the evolving atmospheric conditions are observed.

Existing meteorological models can be classified into several categories, depending on their spatial and temporal performance, their physical formulation and the type of outputs provided. Global models are very autonomous, working from coarse weather information updates provided by international meteorological agencies at high frequencies. Their granularity and accuracy make them useful for strategic planning of air vehicle trajectories (e.g. wind-optimal routes over oceanic regions). Mesoscale models go further and implement complex physical models to provide forecasts (for example, the forecasts typically used in public weather information services). These mesoscale models accept the output of global models, as well as in-situ measurements, as part of the input dataset. Local models use downscaling techniques to couple current and forecasted weather information with precise terrain models and other statistical databases. This achieves better estimations of atmospheric properties over relatively small geographical areas, but usually at the expense of significantly higher computational power and data requirements.

Although aviation is a major customer of meteorological forecasts provided by meteorological models, none of the existing models has been specifically designed to support short-term (e.g. 20 minutes to 2 hours), highly accurate prediction of atmospheric properties over a very small airspace volume adjacent to ground level (e.g. 25 nautical miles×15,000 ft, so much smaller than the typical volumes considered in meteorology).

Consequently, current airspace management automation tools (such as flight data processing systems, arrival management tools, flight management systems, and mission command and control environments in charge of supporting the operation of aerial vehicles) either rely on very poor atmospheric data coming from coarse and very often out-of-date observations or historic records, or they simply assume standard atmospheric conditions. As a result of this uncertainty in atmospheric conditions, there is a shortfall in the accuracy of the predicted trajectories upon which flight management and traffic management decisions are based which, in turn, leads to large inefficiencies and unacceptable performance.

There are long-term efforts to provide improved forecasts of localised atmospheric conditions. These efforts envisage developing local meteorological models that receive as inputs as many direct wind (w), pressure (p) and temperature (T) observations as possible. These observations would be provided by the air vehicles operating within the airspace volume of interest. However, such an approach will have to overcome some significant hurdles if it is to succeed, as follows.

To collect the required atmospheric data from the air vehicles requires collaboration by the air vehicles. For example, the air vehicles must be equipped with atmospheric data acquisition and communication facilities such as ADS-B. This technology requires observation equipment, data processing and datalink communication equipment. At present, such airborne equipment is barely available, remains costly and is still subject to standardization and adoption issues. It is anticipated that such a system will take many years to develop into a form that may be readily deployed.

The necessary data communication is subject to datalink issues such as range and bandwidth limitations, outages and prioritisation when demand is too heavy. To overcome these issues requires putting in place a service-oriented collaborative process and this is not trivial, bearing in mind the many parties involved, all of which have to be properly equipped.

The potentially large data set collected from the many air vehicles places a requirement for very high computing power to produce the model outputs.

In summary, there are no existing satisfactory solutions to the problem of accurately predicting atmospheric properties in a small volume of airspace adjacent to the ground, and the solutions envisaged will only be achievable in a datalink-enabled collaborative environment. In domains like air traffic management, to realise such a system is expected to take a long time, in the order of fifteen years or more, and will require overcoming significant technical, economical, political and regulatory hurdles.

The ability to describe and to predict an aircraft's trajectory is also useful, for many reasons. By trajectory, a four-dimensional description of the aircraft's path is meant.

The description may be the evolution of the aircraft's state with time, where the state may include the position of the aircraft's centre of mass and other aspects of its motion such as velocity, attitude and weight. In order to predict an aircraft's trajectory unambiguously, one must solve a set of differential equations that model both aircraft behaviour and atmospheric conditions.

Aircraft intent is described using a formal language, and provides an unambiguous description of an aircraft's trajectory, i.e. the information it contains closes all degrees of freedom of the aircraft's motion. As such, it represents a complete description of the trajectory. The aircraft intent may be expressed as a structured set of instructions that are used by a trajectory computation infrastructure to calculate the resulting unique trajectory. The instructions should include configuration details of the aircraft (e.g. landing gear deployment), and procedures to be followed during maneuvers and normal flight (e.g. track a certain lateral path or hold a given airspeed). These instructions capture the basic commands and guidance modes at the disposal of the pilot and the aircraft's flight management system to direct the operation of the aircraft. Thus, aircraft intent may be thought of as an abstraction of the way in which an aircraft is commanded to behave by the pilot and/or flight management system.

EP patent application 07380259.7, published as EP-A-2, 040,137, also in the name of The Boeing Company, describes aircraft intent in more detail, and the disclosure of this application is incorporated herein in its entirety by reference.

Aircraft intent data may be provided by the aircraft or the aircraft operator. However, aircraft intent data is not always readily available. In such situations, it may be useful to be able to obtain the aircraft intent in some other way.

SUMMARY

Against this background, and from a first aspect, the present disclosure resides in a computer-implemented method of providing data relating to atmospheric conditions in an airspace. The method uses observations of aircraft trajectories through the airspace. Atmospheric conditions such as wind, temperature and pressure may be inferred and described in the atmospheric conditions data that is provided. A computer system performs the following steps.

The computer system is used to (a) identify aircraft flying within the airspace. In step (b), for at least some of the aircraft identified, the computer system processes the aircraft. That is, the computer system determines an observed trajectory of the aircraft, determines initial conditions of the aircraft, determines the type of the aircraft and retrieves from memory aircraft performance data relating to that type of aircraft, and retrieves from memory aircraft intent data relating to the aircraft stored therein. The aircraft intent data provides an unambiguous description of the aircraft's trajectory through the airspace. The aircraft intent data may provide this description expressed using a formal language.

Determining the trajectory of the aircraft may comprise determining a time-evolving sequence of positions of the aircraft. The trajectory maybe determined using radar data, ADS-B data or ADS-C data.

Determining initial conditions of the processed aircraft may be performed by using the trajectory data, for example to establish an initial position of the processed aircraft. Determining initial conditions of the processed aircraft may be performed by using the aircraft intent data, for example to establish any of an initial position of the processed aircraft, an initial velocity or speed of the processed aircraft, an initial attitude or an initial configuration of the processed aircraft.

The computer system also (c) uses as inputs the observed trajectories, the initial conditions, the aircraft performance data, and the aircraft intent data for the processed aircraft, and (d) infers from the inputs the atmospheric conditions data that, in combination with the aircraft intent data and the aircraft performance data, would give rise to the observed trajectory for each processed aircraft.

For example, the computer system may use the aircraft intent data that unambiguously defines the aircraft's trajectory to infer a set of atmospheric conditions that, when taken with the aircraft intent data, the initial conditions and the aircraft performance data of the processed aircraft, would result in a trajectory computation engine generating trajectories that match as closely a possible the observed trajectories. This may see atmospheric conditions generated, tested to see what calculated trajectories the atmospheric conditions produce, and then the atmospheric conditions evolved so that they converge on an optimum set of atmospheric conditions that best match the available collection of observed trajectories.

Alternatively, the observed trajectories, the aircraft intent data, initial conditions, aircraft performance data may be used to create an optimisation problem (which in particular cases might be of linear nature) that may be solved to provide a set of atmospheric conditions. The resolution of the atmospheric conditions determined may depend upon the amount of data used in the calculation. That is, the more aircraft observed, and the greater the density of the aircraft, the better the resolution achievable in the atmospheric conditions calculated.

An initial set of atmospheric conditions assumed for the airspace or calculated for the airspace earlier may be used to guide step (d). For example, atmospheric conditions data found according to the first aspect of the disclosure may be used as an input into a later execution of the same method.

The method may also comprise the computer system (e) providing as an output the calculated atmospheric conditions data in the airspace.

Thus, the present disclosure makes use of indirect measurements, which are readily available in today's airspace management systems, to derive information about the wind and other atmospheric properties within a given airspace. This provides far superior knowledge of actual atmospheric conditions than current forecasting methods, and it is possible to infer with greater accuracy the distribution of pressure, temperature and wind speed both spatially and temporally.

When compared with the proposed prior art method that sees aircraft communicating atmospheric data in a collaborative network, the present disclosure offers several advantages. There are no requirements for special airborne equipment or for an additional data communication infrastructure. Moreover, the aircraft are only passively involved and so there is no requirement for the aircraft to collaborate actively. However, in some embodiments it is advantageous for aircraft intent to be explicitly communicated by the aircraft.

The computer system may also (f) use the calculated atmospheric conditions data, the aircraft intent data and the aircraft performance data, to determine a calculated trajectory for each processed aircraft. Then, the computer system may (g) compare the calculated trajectory to the observed trajectory for each processed aircraft and determine those processed aircraft with calculated trajectories that match the observed trajectories within a predetermined threshold. The computer system may (h) form a group of discarded aircraft by discarding the observed trajectories, the aircraft intent data and the aircraft performance data for each processed aircraft with a calculated trajectory that does not match its observed trajectory within the predetermined threshold. The computer system may form retained aircraft by retaining the observed trajectories, the aircraft intent data and the aircraft performance data for each processed aircraft with a calculated trajectory that matches its observed trajectory within the predetermined threshold. Then, the computer system may (i), for the retained aircraft, determine from the observed trajectories, the initial conditions, the aircraft performance data, and the aircraft intent data, the atmospheric conditions data that, in combination with the aircraft intent data and the aircraft performance data, would give rise to the observed trajectory for each retained aircraft.

Thus, the accuracy of the first iteration of calculating the atmospheric conditions data is tested through a comparison of the resulting calculated trajectories to the observed trajectories. Any processed aircraft having calculated trajectories that show a significant difference to their observed trajectories are assumed to contain an error in their data, be that an error in the observed trajectory (e.g. corrupt data) or in the aircraft intent data (e.g. the aircraft did not follow the filed aircraft intent data). Moreover, the assumed errors in the data may well have lead to a reduced accuracy in the calculated atmospheric conditions data. So, the processed aircraft having calculated trajectories showing a significant difference to their observed trajectories are discarded and a second calculation is performed of the atmospheric conditions using the data from just the retained aircraft, which should lead to an improved refinement of the atmospheric conditions inferred.

Optionally, the computer system may in step (g), further calculate an overall measure of how well the calculated trajectories match the observed trajectories. This overall measure may be used to determine whether to perform steps (h) and (i) above. That is, the overall measure maybe used to guide whether further iterations of discarding aircraft and recalculating atmospheric conditions should be undertaken. This method may be repeated multiple times, that is it may be repeated until the overall measure indicates a satisfactory correspondence between calculated and observed trajectories, or until an upper limit to the number of iterations is reached.

The computer system may (j) for each aircraft, compare the trajectory calculated at step (i) to the observed trajectory, and further calculate an overall measure of how well the calculated trajectories at step (i) match the observed trajectories. Then, providing as an output the calculated atmospheric conditions data in the airspace at step (e) may comprise providing the atmospheric conditions data with the better overall measure determined in steps (g) and (j). This safeguards against a further iteration providing inferior results for the calculated atmospheric conditions.

From a second aspect, the present disclosure resides in a computer-implemented method of providing data relating to atmospheric conditions in an airspace and aircraft intent of aircraft flying through the airspace using observations of the aircraft trajectories through the airspace. This method is effectively an extension of the first aspect of the disclosure, extended to cover aircraft that have not filed any aircraft intent data or partial aircraft intent data that does not provide an unambiguous description of all of the aircraft's trajectory through the airspace. Rather than merely discarding such aircraft from consideration, as may be done in the method according to the first aspect of the disclosure, the aircraft may be included where it is possible to make assumptions about their aircraft intent based upon the observed trajectories. Thus, the optional features described above with respect to the method according to the first aspect of the disclosure apply equally well to the method according to the second aspect of the disclosure.

The method comprises using a computer system to (i) identify aircraft flying within the airspace. Then, the computer system (ii), for at least some of the aircraft identified, determines a trajectory of the aircraft, determines the initial conditions of the aircraft, determines the type of the aircraft and retrieves from memory aircraft performance data relating to that type of aircraft, and retrieves from memory any filed aircraft intent data relating to the aircraft stored therein. The aircraft intent data provides an unambiguous description of the aircraft's trajectory through the airspace or, if partial aircraft intent data, provides a description of at least some of the trajectory. The aircraft intent data may provide a description expressed in a formal language.

The computer system (iii) uses as inputs the trajectories, the initial conditions, the filed aircraft intent data, and the aircraft performance data for the processed aircraft, and (iv) determines from the inputs the atmospheric conditions data and missing aircraft intent data that, in combination with the filed aircraft intent data and the aircraft performance data, would give rise to the determined trajectory for each processed aircraft.

The computer system provides as an output data corresponding to the description of the atmospheric conditions for the airspace and/or the calculated missing aircraft intent.

In step (iii), the computer system may, for processed aircraft not having filed aircraft intent data or only partial aircraft intent data stored in the memory, compare the observed trajectory of that aircraft with reference trajectories to identify a match between trajectories. Alternatively or additionally, in step (iii) the computer system may, for processed aircraft not having filed aircraft intent data or only partial aircraft intent data stored in the memory, compare the observed trajectory of that aircraft with reference profiles such as speed profiles to identify a match. In either case, if a match is found, the computer system may generate the missing aircraft intent data from a template associated with the matching reference trajectory/profile. Thus, the processed aircraft is retained. Alternatively, if no match is found, the computer system may discard the observed trajectory, the filed aircraft intent data and the aircraft performance data for that processed aircraft such that it becomes a discarded aircraft. The computer system may then use as inputs the observed trajectories, the initial conditions, combined aircraft intent data including the filed aircraft intent data and the generated missing aircraft intent data, and the aircraft performance data for the retained aircraft to determine the atmospheric conditions data that, in combination with the combined aircraft intent data and the aircraft performance data, would give rise to the determined trajectory for each retained aircraft.

For example, the reference trajectories and associated templates may describe standard instrument departures (SIDs) and standard terminal arrivals (STARs) into an airport. When a trajectory is observed to follow one of these known SIDs or STARs, it can be assumed that the aircraft if following the associated aircraft intent for that SID or STAR. For example, assumptions may be made regarding the airspeed of the aircraft in line with the restrictions on airspeed either followed according to custom or by necessity for that SID or STAR. The reference profiles may be speed profiles, for example showing calibrated airspeed (CAS) or Mach. Matching speed profiles may be used as another way to identify commonly flown routes like STARS and SIDs.

The method may further comprise the computer system (vi) calculating from the calculated atmospheric conditions data, the combined aircraft intent data and the aircraft performance data, a calculated trajectory for each retained aircraft. The computer system may (vii) compare the calculated trajectory to the observed trajectory for each retained aircraft and determine those aircraft with calculated trajectories that match the observed trajectories within a first predetermined threshold. Then, the computer system may discard the observed trajectories, the aircraft intent data and the aircraft performance data for each formerly retained aircraft with a calculated trajectory that does not match its observed trajectory within the predetermined first threshold such that the aircraft becomes a discarded aircraft. In addition, the computer system may retain the observed trajectories, the aircraft intent data and the aircraft performance data for each retained aircraft with a calculated trajectory that matches its observed trajectory within the first predetermined threshold. The computer system may (ix) determine from the observed trajectories, the initial conditions, the aircraft performance data, and the combined aircraft intent data for the twice retained aircraft, the atmospheric conditions data that, in combination with the combined aircraft intent data and the aircraft performance data, would give rise to the observed trajectory for each twice retained aircraft.

Thus, poor results may be discarded in an attempt to improve the estimate of the atmospheric conditions. A more refined method sees only the worst cases discarded. That is, poorly matched trajectories are discarded, well matched trajectories are retained with the same aircraft intents, and reasonably matched trajectories are retained although their aircraft intents are completed or amended. For example, missing aircraft intent data may be generated according to an alternative template, say from the next best matching reference trajectory. Alternatively, other strategies may be implemented to improve the aircraft intent data like generating instructions that increase throttle where an aircraft's calculated trajectory is seen to fall behind its observed trajectory.

Consequently, the computer system may (vi) calculate from the calculated atmospheric conditions data, the combined aircraft intent data and the aircraft performance data, a calculated trajectory for each retained aircraft; (vii) compare the calculated trajectory to the observed trajectory for each retained aircraft and determine those retained aircraft with calculated trajectories that match the observed trajectories within a first predetermined threshold and within a second predetermined threshold; (viii) discard the observed trajectories, the aircraft intent data and the aircraft performance data for each retained aircraft with a calculated trajectory that does not match its observed trajectory within the predetermined first threshold with those aircraft becoming discarded aircraft; amend the missing aircraft intent data and retaining the observed trajectories and the aircraft performance data of each retained aircraft with a calculated trajectory that matches its observed trajectory within the predetermined first threshold but does not match its observed trajectory within the predetermined second threshold with those aircraft becoming twice retained aircraft; and retain the observed trajectories, the aircraft intent data and the aircraft performance data for each retained aircraft with a calculated trajectory that matches its observed trajectory within the first and second predetermined thresholds with those aircraft becoming twice retained aircraft; and (ix) determine from the observed trajectories, the initial conditions, the aircraft performance data, and the combined aircraft intent data for the twice retained aircraft, the atmospheric conditions data that, in combination with the combined aircraft intent data and the aircraft performance data, would give rise to the observed trajectory for each twice retained aircraft.

In step (vii), the computer system may further calculate an overall measure of how well the calculated trajectories match the observed trajectories. Steps (viii) and (ix) may be performed depending upon an evaluation of the overall measure.

The computer system may (x) for each aircraft, compare the trajectory calculated at step (ix) to the observed trajectory, and further calculate an overall measure of how well the calculated trajectories at step (ix) match the observed trajectories. Then, providing as an output the calculated atmospheric conditions data in the airspace and optionally the missing aircraft intent data may comprise providing the atmospheric conditions data and optionally the missing aircraft intent data with the better overall measure determined in steps (vii) and (ix).

In order to help guide the aircraft intent generation process, the method may comprise the computer system retrieving from memory any filed flight intent data relating to an aircraft, and using the flight intent data when generating the missing aircraft intent data. As mentioned above, the flight intent may define some aspects of the aircraft intent and so help guide in completing a description of aircraft intent.

When calculating the atmospheric conditions and/or missing aircraft intent, the computer system may use an evolutionary algorithm.

The present disclosure extends to a computer system comprising memory having stored therein computer program instructions that, when executed, cause the computer system to implement any of the methods described above; and to a computer program comprising instructions that, when executed, cause a computer system to implement any of the methods described above.

BRIEF DESCRIPTION OF THE DRAWINGS

In order that the present disclosure may be more readily understood, preferred embodiments will now be described, by way of example only, with reference to the following drawings in which.

DETAILED DESCRIPTION

Figure 1:
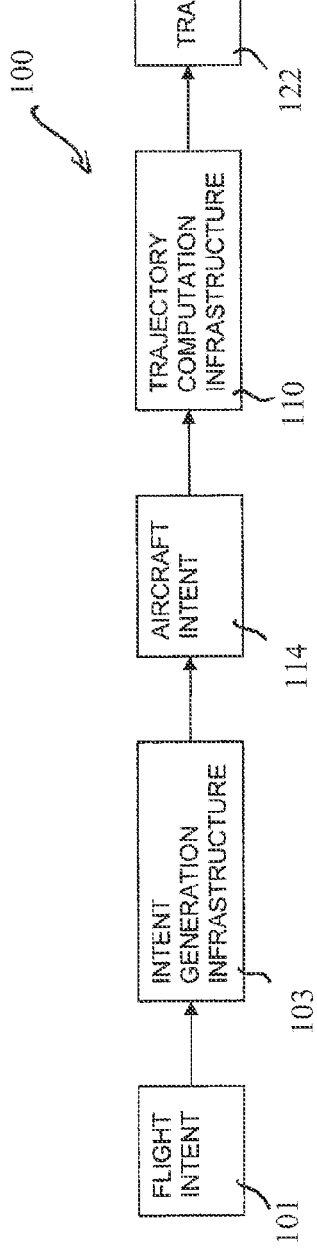
FIG. 1 is a system for computing an aircraft's trajectory using flight intent and aircraft intent.

To appreciate the present disclosure, it is necessary to explain several details related to trajectory prediction. In essence, the process of predicting the trajectory of an air vehicle involves the following pieces of information.

Aircraft intent (AI) is a formal description of how the air vehicle is to be operated during the time interval for which the predicted trajectory is required. This information, which can be expressed by means of an aircraft intent description language (AIDL) captures all the details related to the specific aircraft motion that gives rise to the trajectory of interest.

The aircraft performance model (APM) provides all the aircraft-specific details that influence aircraft response. For example, it may include aerodynamic characteristics (lift, drag, etc) and propulsive characteristics (thrust, fuel, etc), preferred and default flap schedules and other maneuvers, operational limitations, etc.

The Earth model (EM) provides all the details necessary to represent mathematically the influences of the environment on the aircraft motion. For example, it may reflect gravity, geopotential, atmospheric conditions, etc. Most importantly, the Earth model should provide 4D predictions (i.e. for any given position and time) of wind velocity, pressure and temperature.

The prediction process also requires a formulation of the initial conditions (IC), namely the parameters that characterise the aircraft state (position, velocity, attitude and mass) at the beginning of the time interval of interest.

The trajectory computation process essentially consists of solving a mathematical problem that arises from a certain formulation of the air vehicle's motion physics made out in terms of the aforementioned elements. The result is the aircraft trajectory (AT), i.e. a discrete sequence of aircraft states (position and velocity, and optionally attitude and other additional characteristics of the motion, e.g. mass).

In order to predict aircraft trajectory unambiguously, one must solve a set of differential equations that model both aircraft behaviour and atmospheric conditions. The computation process requires inputs corresponding to the aircraft intent, often derived from flight intent.

Aircraft intent must be distinguished from flight intent. Flight intent may be thought of as a generalisation of the concept of a flight plan, and so will reflect operational constraints and objectives such as intended or required route and operator preferences. Flight intent refers to requirements imposed on an aircraft's trajectory that, generally, do not unambiguously define such trajectory, as the information it contains does not necessarily close all degrees of freedom of the aircraft's motion. Put another way, there are likely to be many aircraft trajectories that would satisfy a given flight intent. Thus, flight intent may be regarded as a basic blueprint for a flight or a set of requirements that the ensuing aircraft trajectory must comply with, but that lacks the specific details that are present in the aircraft intent and that are required to determine unambiguously how the aircraft will behave as to meet these requirements (i.e. as to exhibit a particular trajectory).

For example, the instructions to be followed during a standard terminal arrival route (STAR) or a standard instrument departure (SID) route that typically appear in the airport information publication (AIP) departure/arrival charts would correspond to an example of flight intent. In addition, airline preferences such as a prescribed cost index (e.g. describing a preference towards prioritising punctuality of flights against economic cost of flights) to be achieved may also form an example of flight intent. To derive aircraft intent instances from flight intent like a SID procedure, the airline's operational preferences and the actual pilot's decision making process can be combined.

FIG. 1 shows a basic structure 100 to derive aircraft intent, and how aircraft intent may be used to determine and compute the aircraft's trajectory univocally. In essence, flight intent 101 is provided as an input to an intent generation infrastructure 103. The intent generation infrastructure 103 determines aircraft intent 114 using the instructions provided by the flight intent 101 and other inputs to ensure a set of aircraft intent instructions is provided that will allow an unambiguous determination of the trajectory. The aircraft intent 114 output by the intent generation infrastructure 103 may then be used as an input to a trajectory computation infrastructure 110. The trajectory computation infrastructure 110 calculates the resulting trajectory unambiguously determined beforehand by the aircraft intent 114, for which additional inputs are required to solve the equations of motion of the aircraft.

Figure 2:
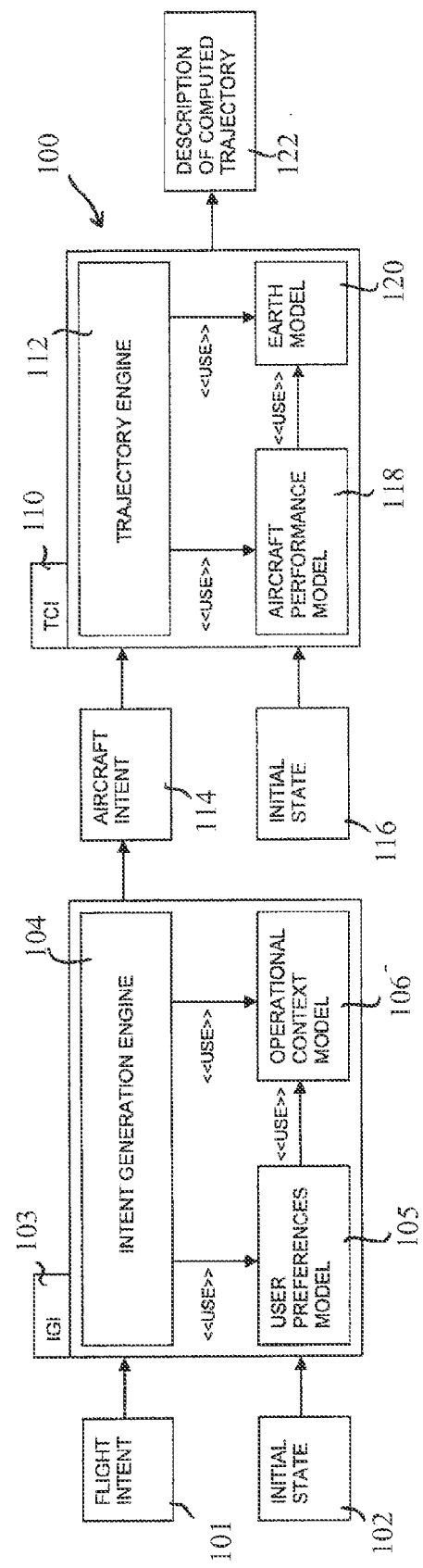
FIG. 2 shows the system of FIG. 1 in greater detail.

FIG. 2 shows the structure 100 of FIG. 1 in further detail. As can be seen, the intent generation infrastructure 103 receives a description of the flight intent 101 as an input along with a description of the initial state 102 of the aircraft (the initial state of the aircraft may be defined as part of the flight intent 101, in which case these two inputs are effectively one and the same). The intent generation infrastructure 103 comprises an intent generation engine 104 and a pair of models, one encompassing the user preferences 105 and one representing the operational context 106 of the aircraft.

The user preferences model 105 embodies the preferred operational strategies governing the aircraft, e.g. the preferences of an airline with respect to loads (both payload and fuel); how to react to meteorological conditions such as temperature, wind speeds, altitude, jet stream, thunderstorms and turbulence as this will affect the horizontal and vertical path of the aircraft as well as its speed profile; cost structure such as minimising time of flight or cost of flight, maintenance costs, environmental impact; communication capabilities; passenger comfort requirements and security considerations.

The operational context model 106 embodies constraints on use of airspace, e.g. those imposed by the air traffic control to all flights operating within the given airspace such as speed, altitude restrictions, etc. The intent generation engine 104 uses the flight intent 101, initial state 102, user preferences model 105 and operational context model 106 to provide the aircraft intent 114 as its output. The process performed by the intent generation infrastructure 103 can be seen as determining a particular way of commanding the aircraft such that the resulting trajectory 122 meets the requirements set by the specific flight intent 101 and those generally imposed by the user 105 and the operational context 106.

FIG. 2 also shows that the trajectory computation infrastructure 110 comprises a trajectory engine 112. The trajectory engine 112 requires as inputs both the aircraft intent description 114 explained above and also the initial state 116 of the aircraft. The initial state 116 of the aircraft may be defined as part of the aircraft intent 114 in which case these two inputs are effectively one and the same. The initial state 116 may consist of the same information as the initial state input 102 provided to the intent generation infrastructure 103 or it may be augmented to include further aspects of the initial aircraft state as needed to determine an unambiguous trajectory. For the trajectory engine 112 to provide a description of the computed trajectory 122 for the aircraft, the trajectory engine 112 uses two models: an aircraft performance model 118 and an Earth model 120.

The aircraft performance model 118 provides the values of the aircraft performance aspects required by the trajectory engine 112 to integrate the equations of motion. These values depend on the aircraft type for which the trajectory is being computed, the aircraft's current motion state (position, velocity, weight, etc) and the current local atmospheric conditions. In addition, the performance values may depend on the intended operation of the aircraft, i.e. on the aircraft intent 114. For example, a trajectory engine 112 may use the aircraft performance model 118 to provide a value of the instantaneous rate of descent corresponding to a certain aircraft weight, atmospheric conditions (pressure altitude and temperature) and intended speed schedule (e.g. constant calibrated airspeed). The trajectory engine 112 will also request from the aircraft performance model 118 the values of the applicable limitations so as to ensure that the aircraft motion remains within the flight envelope. The aircraft performance model 118 is also responsible for providing the trajectory engine 112 with other performance-related aspects that are intrinsic to the aircraft, such as flap and landing gear deployment times.

The Earth model 120 provides information relating to environmental conditions, such as the state of the atmosphere, weather conditions, gravity and magnetic variation.

The trajectory engine 112 uses the inputs 114 and 116, the aircraft performance model 118 and the Earth model 120 to solve a set of equations of motion. Many different sets of equations of motion are available that vary in complexity, and that may reduce the aircraft's motion to fewer degrees of freedom by means of a certain set of simplifying assumptions. Any of these sets of equations of motion may be used with the present disclosure.

The trajectory computation infrastructure 110 may be air-based or land-based. For example, the trajectory computation infrastructure 110 may be associated with an aircraft's flight management system that controls the aircraft on the basis of a predicted trajectory that captures the airline operating preferences and business objectives. The primary role for land-based trajectory computation infrastructures 110 is for air traffic management.

The basic relationship connecting aircraft intent 114, the aircraft performance model 118, the Earth model 120, the initial conditions 116 and the aircraft trajectory 122 can be written, using set notation, as $\{AI, APM, EM, IC\} \Rightarrow AT$. In other words, given an instance of aircraft intent 114, for a specific aircraft (as reflected by the aircraft performance model 118) performing in a certain environment (reflected by the Earth model 120), starting from the given initial conditions (116), the resulting aircraft trajectory (122) is univocally determined.

Formally speaking, the opposite is not true. That is to say, given a particular aircraft's trajectory 122 (and hence initial conditions because $IC \subset AT$) that belongs to a specific aircraft model (from the aircraft performance model 118) performing in a certain environment (from the Earth model 120), there are in principle many aircraft intents 114 that could give rise to that aircraft's trajectory 122. However, in reality, operational constraints mean that not all possible aircraft intents 114 are equally likely and, in fact, a particular aircraft intent may frequently be assumed. By taking into account the operational reasons behind the process of selecting the most appropriate aircraft intent 114, the most likely aircraft intent 114 may be inferred. For example, approaches to an airport and a particular runway may be required to follow a standard arrival route (STAR) combined with a MACH/CAS speed schedule, and this may be used to determine the aircraft intent 114.

Analogously, given an aircraft intent 114, the resulting aircraft trajectory 122 and the associated aircraft performance model 118, in principle very little could be said about the atmospheric conditions influencing the aircraft's motion. This is because the relationship between $\{AI, APM, AT\}$ and EM is not bijective.

However, rather than using a single instance of aircraft trajectory 122, the present disclosure makes use of the trajectories 122 of many aircraft operating within the same airspace. The inferred Earth model 120 must be valid and equally applicable to all aircraft trajectories 122 for that 4D domain. Put another way, the inferred Earth model 120 has to satisfy simultaneously all the relationships associated to all known instances of $\{AI, APM, AT\}$ for all aircraft. So, using many trajectories provides lots of data to allow the most likely Earth model 120 to be inferred.

This rationale can be summarized as follows. Given a large enough set of trajectory observations (i.e. aircraft trajectories 122) that belongs to known aircraft (and their associated aircraft performance models 118) flying within a certain 4D domain (airspace and time interval), then:
1) it is possible to infer information about both the corresponding aircraft intents 114 and the atmospheric conditions (Earth model 120) that match the observed trajectories; and
2) if the aircraft intents 112 are already known (e.g. through a previously communicated 'business trajectory contract' that each aircraft executes, as a result of which it exhibits the corresponding observed trajectory), then the uncertainty associated with the aircraft intent inferring can be removed thus improving the accuracy of the inferred atmospheric conditions.

Figure 3:
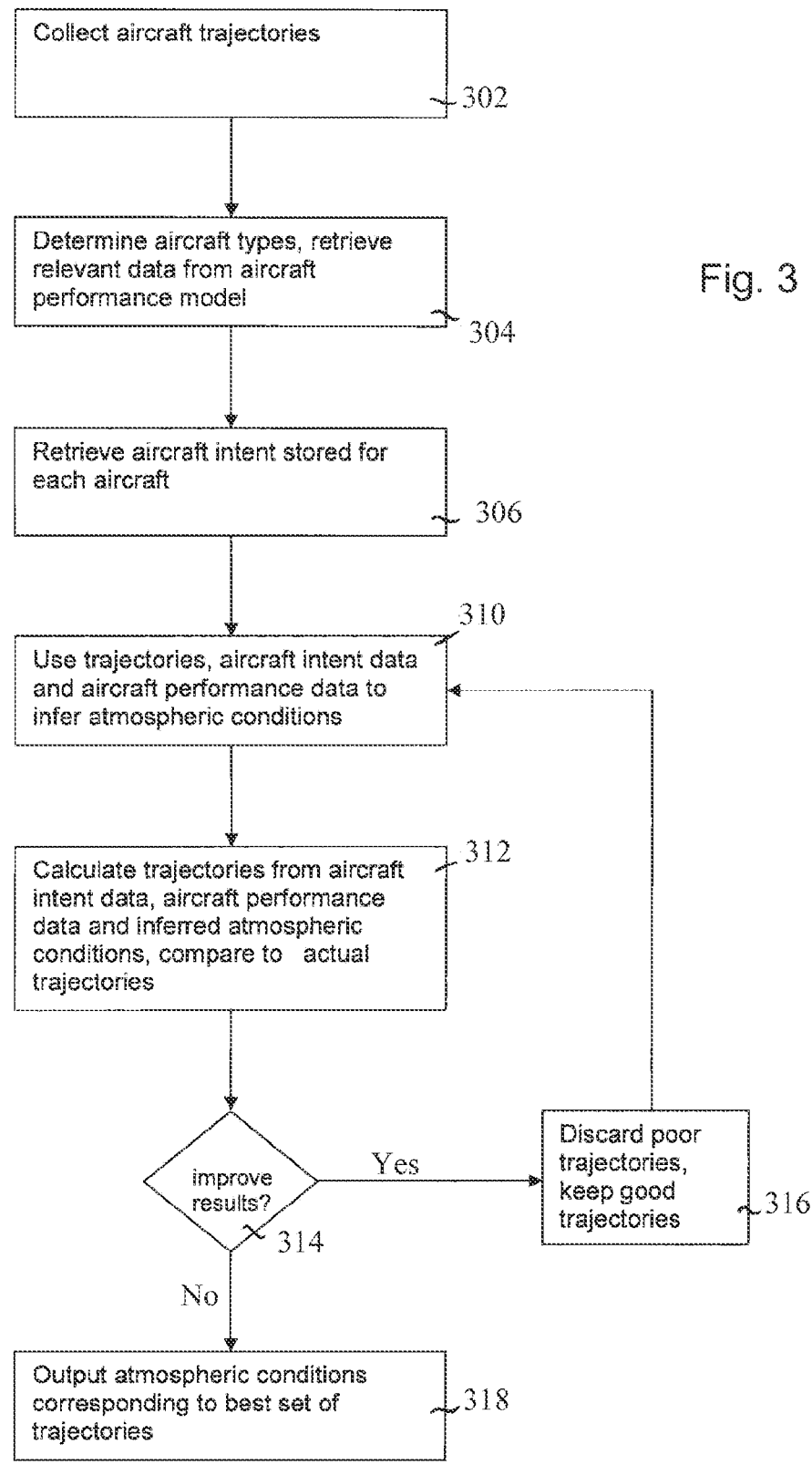
FIG. 3 is a schematic representation of a method of providing data relating to atmospheric conditions according to a first embodiment of the present disclosure.
Figure 4:
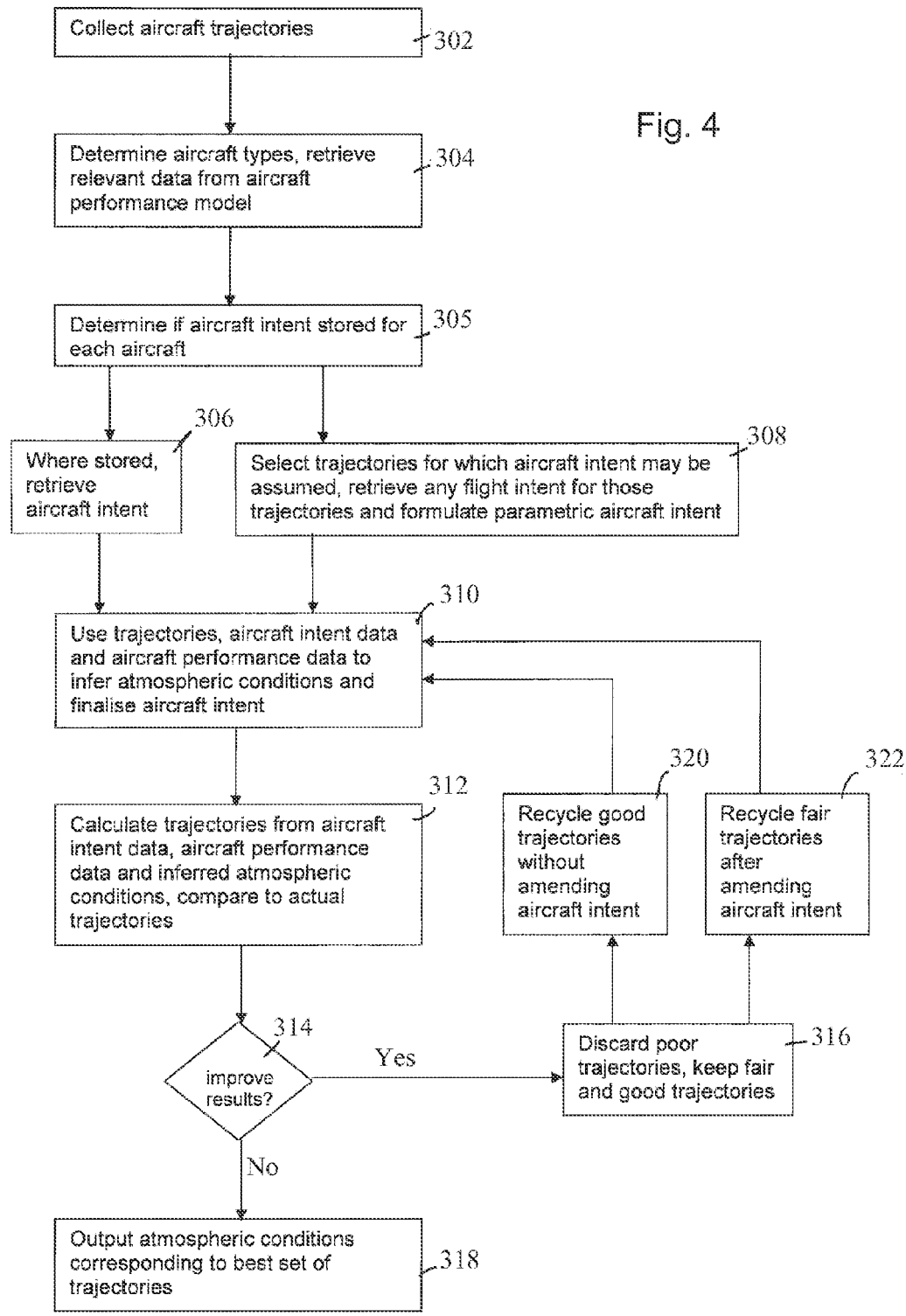
FIG. 4 is a schematic representation of a method of providing data relating to atmospheric conditions and aircraft intent according to a second embodiment of the present disclosure.
Figure 5:
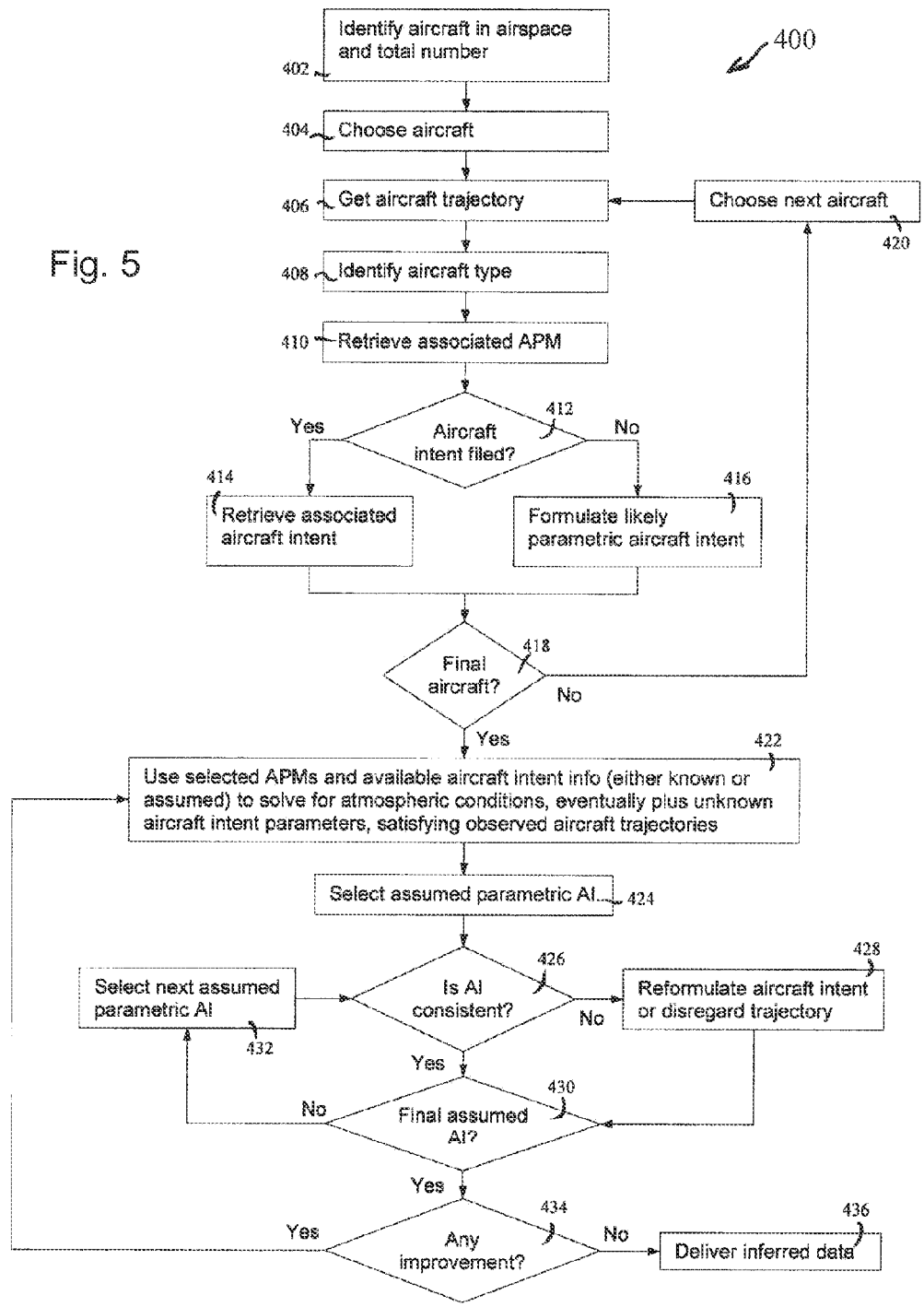
FIG. 5 is a schematic representation of a method providing data relating to atmospheric conditions and aircraft intent according to a third embodiment of the present disclosure.

FIGS. 3 to 5 show three embodiments of methods related to estimating atmospheric conditions using observations of aircraft trajectories. The methods may be implemented using a computer system to perform the calculations required. Any type of commonly-available computer system may be used to implement the methods, provided it has sufficient performance to perform the calculations at the required speed. The computer system may be conventional in providing input devices like keyboards, computer mice, touch screens and microphones, and providing output devices like monitors, displays and speakers. Data storage means may be provided like volatile and non-volatile memory. The computer system may be centralized, or may be distributed with connections provided by a network. For example, the computer system may be located at an airport and may ingest trajectory surveillance data related to the airspace around the airport, such as a defined terminal maneuvering area (TMA).

FIG. 3 shows a method of estimating atmospheric conditions using aircraft trajectories where all the aircraft have provided descriptions of their aircraft intents. The aircraft trajectories are collected from the appropriate surveillance sources at step 302. These are the trajectories of aircraft flying within the airspace of interest. The trajectories of all aircraft or just some aircraft within the airspace may be obtained. This may done using any convenient means. For example, radar data may be used to provide the aircraft trajectories. The trajectories may be saved into memory.

At 304, for each trajectory obtained, the type of the aircraft flying that trajectory is determined. For example, radar traces may be used to identify each aircraft's call sign or tail number, and this may be correlated against records to determine the aircraft's type (e.g. Boeing 777). Alternatively, the exact aircraft type may be specified in the aircraft intent 114 filed. Data pertaining to the aircraft type is retrieved from the aircraft performance model 118 and associated with that aircraft's trajectory saved in memory. The aircraft intent 114 filed by each aircraft is retrieved at 306. This embodiment may be extended to scenarios where not all aircraft have filed aircraft intent 114 by merely removing the aircraft that have not filed aircraft intent 114 at this method step 306. Thus, the method would continue to estimate the atmospheric conditions from trajectory data collected from those aircraft that have filed aircraft intent.

At 310, the trajectories, the data retrieved from the aircraft performance model 118, and the aircraft intents are used in a calculation that determines a set of atmospheric conditions. The calculation also requires the initial conditions $X_0^i$ of each of the aircraft to be determined, although this is simply done using the aircraft trajectories, optionally augmented by data from the aircraft intents 114 (e.g. the radar data may provide position and velocity information and the aircraft intent may provide attitude and/or mass information). This step 310 is described in greater detail below. Step 310 provides a set of atmospheric conditions that may be output directly for use. However, in this embodiment, an attempt is made to improve the results, as follows.

At 312, the determined atmospheric conditions are used to calculate aircraft trajectories. As the atmospheric conditions are determined from many aircraft, uncertainties and errors means that the determined atmospheric conditions will not necessarily result in calculated trajectories that match exactly the measured trajectories obtained for each aircraft. For example, in regions where many aircraft have passed through, the additional data should provide a more accurate estimation of the atmospheric conditions than for regions where few aircraft have passed through.

The calculated trajectories are compared with the measured aircraft trajectories. The errors in trajectory data and aircraft intent data that propagate into the calculated trajectories will produce a divergence from between the calculated and actual trajectories. The amount of divergence is measured and used to determine whether the atmospheric conditions estimation should be improved, as shown at step 314.

At step 314, a determination is made as to whether a further iteration of estimating the atmospheric conditions should be made.

If the determination is in the negative, the method exits at step 318. For example, further iterations may be excluded in any of the following circumstances: where a limit to the number of iterations has been reached, where the divergence in the trajectories has not improved or is reduced by an amount less than a threshold to suggest that the results are converging, or where the divergence is within a threshold to indicate that the estimated atmospheric conditions are considered good enough. Testing against any combination of these criteria is also possible. If the method proceeds to step 318, an output is provided that corresponds to the estimated atmospheric conditions that produced the best set of calculated trajectories.

If the determination at step 314 is in the positive, such that a further iteration of estimating the atmospheric conditions is to be undertaken to try and improve the results, the method continues to step 316. At step 316, the calculated trajectories that deviate from the actual trajectories by more than a tolerance level of disparity are disregarded. That is, the aircraft flying the poorly-matched trajectories are removed from further consideration.

The exception would be those trajectories for which certainty exists about the corresponding aircraft intent. Such data are not discarded, since it is preferred for the atmospheric conditions being inferred to be forced to be as consistent as possible with the data that are known to be certain. In fact, any pair $\{AI_i, AT_i\}$ whose two related aircraft intent and aircraft trajectory elements are known to be certain may act as an attractor in the convergence process, forcing the inferred atmospheric data to make the corresponding relationships $\{AI_i, APM_i, EM, IC_i\} \Rightarrow AT_i$ as true as possible.

Once step 316 has completed and all poorly-matched trajectories have been disregarded, the method returns to repeat step 310. Hence, once more the atmospheric conditions are inferred, this time using the aircraft intents, data from the aircraft performance models and the aircraft trajectories from those aircraft found to have well-matched trajectories from the previous iteration. By discarding the aircraft with poorly-matched trajectories, the set of data from which the atmospheric conditions are estimated is improved as data with errors, such as uncertain aircraft intent (e.g. the aircraft intent of an aircraft discovered to have deviated from its submitted aircraft intent) can no longer negatively influence the estimation. Consequently, an improvement should be seen in the results obtained in the next iteration.

The atmospheric conditions estimated in these repeated iterations are tested to ensure they provide a better fit to the observations. That is, the revised atmospheric conditions are used to calculate trajectories and these are compared against the measured trajectories. This comparison is used at each instance of step 314 to determine whether to exit the method or perform a further iteration to try and improve the estimated atmospheric conditions. When the method exits at step 318, the best set of atmospheric conditions inferred in the previous iterations is provided as the output. In this iterative way, an improved set of atmospheric conditions is determined.

FIG. 4 shows a method of estimating atmospheric conditions. The method of FIG. 4 essentially corresponds to an extension of the method of FIG. 3, and accommodates aircraft that have not provided descriptions of their aircraft intents 114 and attempts to infer estimated aircraft intents 114 for those aircraft. As the methods of FIGS. 3 and 4 are similar, common reference numerals are used to identify similar steps.

Step 302 of FIG. 4 shows that aircraft trajectories are collected from the appropriate surveillance sources, as per step 302 of FIG. 3. At 304, for each trajectory obtained, the type of the aircraft flying that trajectory is determined and aircraft-characteristic data pertaining to the aircraft type is retrieved from the aircraft performance model 118 and associated with that aircraft's trajectory saved in memory, as per step 304 of FIG. 3.

At step 305, each aircraft's identification is again used, this time to determine whether the aircraft has filed aircraft intent 114 or flight intent 101 for its current flight. If aircraft intent data 114 has been filed, this is retrieved at 306 and the method proceeds to step 310.

If aircraft intent data 114 has not been filed for the aircraft, the method continues to step 308. At step 308, an attempt is made to formulate an aircraft intent 114 to match the observed trajectory. This is done by making use of observed trajectories and the aircraft intents 114 that are expected to produce such trajectories. For example, each trajectory of an aircraft for which no aircraft intent 114 has been filed may be compared to a set of template trajectories or typical intent patterns to see if there is a match. For example, a measured trajectory may be found to correspond to a regularly flown STAR trajectory upon approach to an airport: in this case, the aircraft intent 114 corresponding to that STAR may be used. Another example could be to check whether the observed speed profile could match a typical MACH/CAS pattern. If flight intent 101 has been filed, this may be retrieved and used in formulating the aircraft intent 114. For example, a postulated aircraft intent 114 may be checked against the flight intent 101 to ensure consistency, or the flight intent 101 may be used to guide the search for a matching trajectory from templates or patterns.

Thus, where possible, an aircraft intent 114 is formulated for each trajectory. If a trajectory cannot be matched, for example to one of the templates or patterns, that trajectory is disregarded and the corresponding aircraft no longer considered.

Although specific aircraft intent 114 may be formulated that defines unambiguously a trajectory to be followed, it is preferred to formulate the aircraft intent 114 to include at least some instances of parametric aircraft intent. Parametric aircraft intent sees all the intent define all degrees of freedom of the aircraft, although some parameters are defined by allowable parameter ranges rather than specific parameter values. For example, a range of airspeeds may be defined rather than a specific airspeed value. Hence, formulating the most likely aircraft intent (AI) for any particular trajectory i may require considering a finite set of unknown parameters $z^i$ (i=1, . . . , n) as part of the parametric aircraft intent $AI(z^i)$.

With steps 306 and 308 completed, all aircraft still under consideration have an associated aircraft intent 114 and the method may continue to step 310.

At step 310, the trajectories, the aircraft performance data and the aircraft intents 114 are used in a calculation that simultaneously estimates a set of atmospheric conditions and resolves the unknown aircraft intent parameters $z^i$ that lead to the best consistency with all the aircraft trajectories observed. The calculation also requires the initial conditions $X_0^i$ of each of the aircraft to be determined, although part of such information (namely position, speed and given time) is simply obtained from the observed aircraft trajectories or the aircraft intents. This step 310 is described in greater detail below.

At 312, trajectories are calculated from the aircraft intent, aircraft performance data and the atmospheric conditions, and these calculated trajectories are compared against the actual trajectories to check for consistency, in much the same way as for step 312 of FIG. 3. In the embodiment of FIG. 4, step 312 is of particular interest for the aircraft having assumed aircraft intent 114 as it reveals which formulated aircraft intents 114 do not fit acceptably with the respective observed trajectory in the atmospheric conditions inferred. Thus, this comparison step indicates aircraft that may have errors in their measured trajectories, errors relative to the filed aircraft intent 114 or errors in inferred aircraft intern 114.

At step 314, a determination is made as to whether a further iteration of estimating the atmospheric conditions should be made. The determination may be made in any of the ways already described with respect to step 314 of FIG. 3. If the determination is in the negative, the method exits at step 318. If the determination at step 314 is in the positive, such that a further iteration of estimating the atmospheric conditions is to be undertaken to try and improve the results, the method continues to step 316.

The comparison at step 312 is made to determine the deviation of each calculated trajectory to the corresponding observed trajectory. The deviation is referenced to two thresholds used to define well-matched trajectories, fairly-matched trajectories and poorly-matched trajectories. At step 316, aircraft having poorly-matched trajectories are discarded to leave just the aircraft having well-matched and fairly-matched trajectories. The aircraft having well-matched trajectories are selected at step 320 and their aircraft intent 114 is left unrevised. The aircraft having fairly-matched trajectories are selected at step 322, where their aircraft intent 114 is amended to try to improve the resulting estimation of atmospheric conditions and aircraft intent. For example, the parts of the trajectory that do not match well may be identified, and the corresponding parts of the aircraft intent 114 amended. This may involve amending those parts of the aircraft intent 114 to include instances of parametric intent and broader or modified parameter ranges may be specified to allow more flexibility for a better result to be obtained in the optimisation process.

Once steps 320 and 322 have completed, the method returns to repeat step 310. Hence, once more the atmospheric conditions are inferred, this time using the amended formulated aircraft intents (along with the filed aircraft intents, the aircraft performance models, and the aircraft trajectories). The improvement in the formulated aircraft intents made in each iteration should see a concomitant improvement in the estimated atmospheric conditions.

As step 312, the atmospheric conditions inferred in the second and subsequent iterations are tested to ensure they are improved. That is, the comparison of calculated and observed trajectories are used to indicate whether the latest iteration of the estimated atmospheric conditions provide a better fit to the observed trajectories, otherwise the atmospheric conditions inferred from the previous iteration are retained. In this iterative way, the estimations of the atmospheric conditions and the formulated aircraft intents 114 gradually improve and should converge to provide a more accurate set of atmospheric conditions.

FIG. 5 shows a more detailed representation of the method of FIG. 4.

The process 400 begins at step 402 where a determination is made of the number of aircraft flying within the airspace of interest and the identity of each aircraft is found. A list of the aircraft is then compiled. The aircraft in the list are then processed in turn through steps 404 to 418.

At step 404, the first aircraft from the list is chosen and its trajectory is determined from surveillance data at step 406. Then, for the selected aircraft, its aircraft type is determined at step 408 and relevant aircraft-characteristic data are obtained from the aircraft performance model (APM) 118 at step 410.

A check is performed at step 412 to determine whether aircraft intent data 114 have been filed for the selected aircraft. If aircraft intent data 114 have been filed, those aircraft intent data 114 are retrieved at step 414, along with any flight intent information. If aircraft intent data 114 have not been filed, the method continues to step 416.

At step 416, any flight intent data filed are retrieved, and a possible parametric aircraft intent 114 is formulated using the flight intent (if any) and trajectory data available, as was previously described with respect to step 308 in FIGS. 3 and 4. In typical air traffic management environments, a significant amount of flight intent data is available from the flight plan (e.g. lateral path, vertical and speed constraints, etc).

Then, the process of intent generation of 103 can be used in conjunction with knowledge about the user preferences 105 and the operational context 106 to make likely assumptions about the aircraft intent 114 underlying the observed trajectory. Furthermore, sometimes, part of these assumptions can be checked beforehand, by looking at the trajectory's geometric or kinematics aspects. This helps in arriving at a formulation of likely aircraft intent 114 that depends on just a few unknown parameters. However, in some instances, it may not be possible to infer aircraft intent 114. In these cases, the associated aircraft are removed from the list that was previously compiled at step 402.

The method continues from both steps 414 and 416 to the same step 418 where a determination is made to see whether steps 406 to 418 have been performed for all aircraft within the list of aircraft. If not all aircraft have been considered, the method loops back via step 420 where an aircraft that has yet to be considered is chosen from the aircraft list. Steps 406 to 418 are then repeated for the newly-chosen aircraft. After repeated iterations, aircraft intents 114 (in all or in part possibly parametric) become available for as many aircraft as possible.

When all aircraft from the aircraft list have been considered, and the determination at step 418 is positive, the method progresses from step 418 to step 422 where all the data collected are used to solve simultaneously the atmospheric conditions and the unknown aircraft intent parameters introduced in step 416.

To infer the unknown aircraft intent parameters, the formulated aircraft intents 114 obtained each time step 416 as invoked are used. These aircraft intents 114 describe each aircraft's motion during the current time frame, as broken down into intervals matched with corresponding aircraft intent instructions. These data, along with data relating to possible atmospheric conditions (for example, using coarse meteorological data generically describing the airspace), are used to form a multivariate cost function. This cost function is then used to drive an evolutionary algorithm that evolves the formulated aircraft intent and atmospheric conditions to formulations that reduce the deviation between the observed trajectories and the trajectories resulting from the estimated atmospheric conditions and aircraft intents 114.

Once the atmospheric conditions and the unknown aircraft intent parameters have been determined at step 422, a consistency check is performed against the assumptions made in 416 related to unknown aircraft intent details. Each assumed aircraft intent 114 is checked in turn through steps 424 to 432.

The consistency check starts at step 424 where one of the aircraft with an assumed aircraft intent 114 is selected. At step 426, the selected aircraft intent 114 is checked for consistency by comparing the trajectory that results form the estimated atmospheric conditions and aircraft intent 114 with the observed trajectory. The deviation of the two trajectories is determined and compared to a threshold to determine whether the match is acceptable or not. If an acceptable match is found, then the process continues to step 430; otherwise the process continues to step 428.

At step 428, aircraft intents 114 producing unacceptable matches in trajectories are reformulated or, if according to the data identified, the trajectory cannot be assigned a likely aircraft intent that helps in the identification process of step 422, then such trajectory is disregarded and the associated aircraft is removed from the aircraft list. The aircraft intent 114 is reformulated to provide a better fit of the calculated and observed trajectories. That is, the parameters of the aircraft intent 114 are adjusted until the best fit between the trajectories results. In general, this is a non-linear optimisation problem; essentially a curve fitting exercise that generates a new set of aircraft intent data 114. In particular cases the optimization problem might directly become linear or it might be linearized using iterative methods.

The process continues down to step 430, either directly from step 426 or indirectly via step 428, where a determination is made to see whether the consistency checking has been performed for all trajectories whose associated aircraft intent 114 contains assumptions made in step 416. If not all the assumed aircraft intents 114 have been checked, the process continues to step 432, where the aircraft intent of another aircraft is selected for checking through comparison of the calculated and observed trajectories. Steps 426 to 432 are repeated for the each aircraft intent 114 until all the assumed aircraft intents 114 have been checked.

After that, the process continues to step 434 where an assessment is made to determine whether any of the aircraft intents 114 considered through steps 426 and 430 have been amended. If so, that means that a better overall fit for the inferred atmospheric conditions can be expected and thus the process jumps back to step 422, from where a further iteration of estimating atmospheric conditions and aircraft intents 114, and consistency checks are performed. Otherwise, if none of the aircraft intents 114 were amended, the process is considered finalized and the resulting "best fit" is delivered at step 436.

Figure 6:
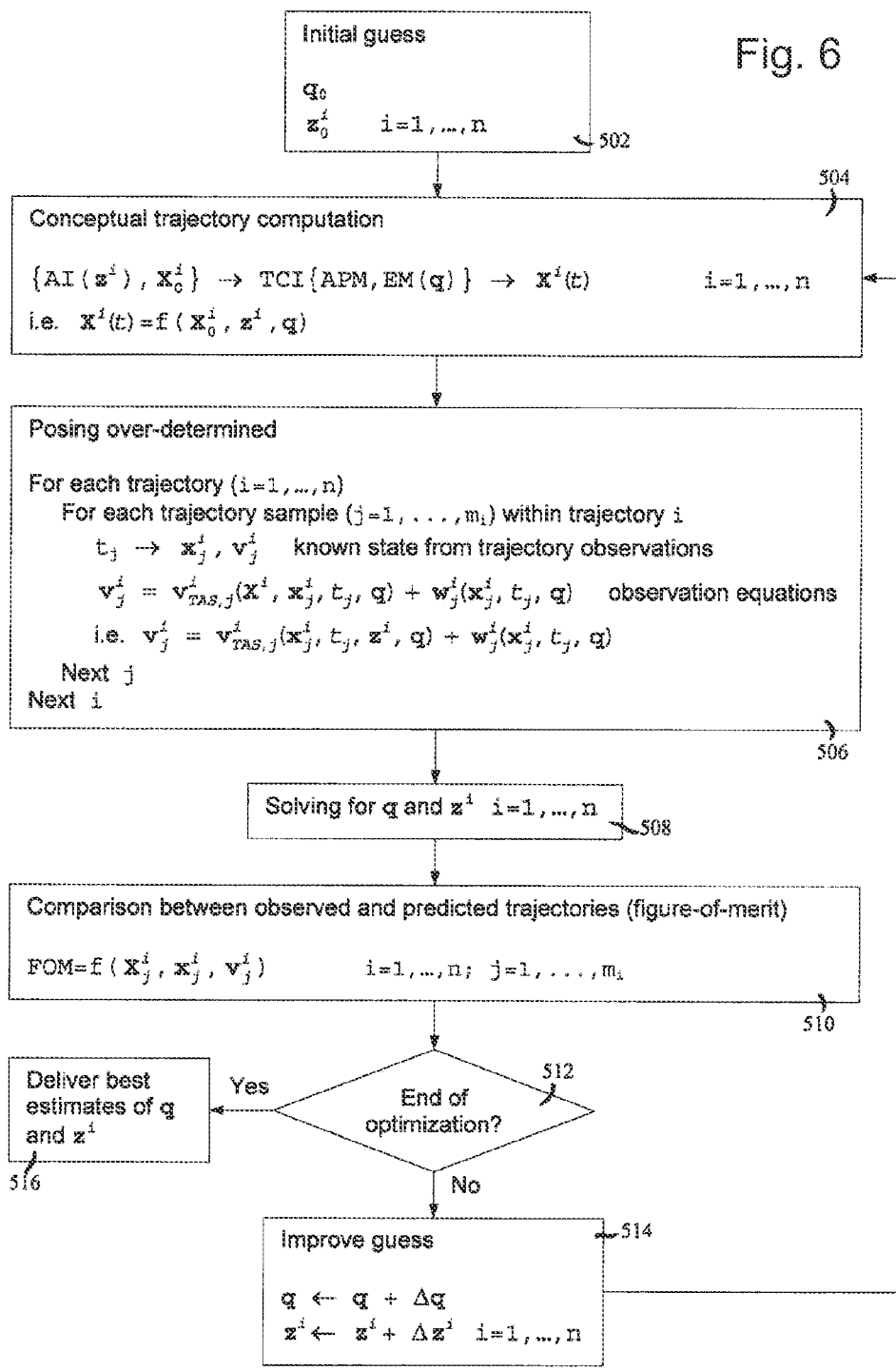
FIG. 6 is a formal representation of a generic method for solving the over-determined multivariate optimization problem underlying the method shown in FIG. 5.

FIG. 6 illustrates a general expansion of the estimation and improvement process of FIGS. 3 to 5, i.e. the estimation of atmospheric conditions along with inference of missing aircraft intent details, and their subsequent optimisation. To understand the process, let us consider that the intended 4D atmospheric model can be represented as the parametric functions of position x, time t and a set of Q parameters $q=\{q_1, \ldots, q_Q\}$:

$$p = f(x,t,q) \; x = [x_1, x_2, x_3] = f(\lambda, \varphi, h) \quad (1)$$

$$T = f(x,t,q) \quad (2)$$

$$w = f(x,t,q) \; w = [w_1, w_2, w_3] \quad (3)$$

where p is pressure, T is temperature and w is the wind vector. We can also assume that each instance of aircraft intent $AI^i$ (i=1, . . . , n where n is the number of aircraft considered) that participates in the estimation process contains a set of parameters, some of which may require resolving if the aircraft intent is parametric. For each instance of aircraft intent 114, there will be $k_i \geq 0$ unresolved parameters $z^i = \{z_1^i, \ldots, z_{k_i}^i\}$. The total number of unknown parameters that must be found across all aircraft for both the atmospheric conditions and the instances of parametric aircraft intent 114 is Q+K where:

$$K = \sum_{i=1}^{n} k_i. \quad (4)$$

The estimation process begins at 502 where an initial guess of the unknown parameter values is proposed. The guesses may be guided by known data, e.g. flight path constraints, airline operating preferences.

The next step, step 504, conceptually represents the fact that, given the aircraft intents AI, which depend on the parameters $z^i$, the initial conditions $X_0^i$ the aircraft performance model 118 and the earth model 120 that depends on the parameters q, the respective trajectories $X^i(t)$ can be determined and computed. In practical terms, the trajectory computation might not be needed, but the underlying equations can be merged into those of step 506.

In step 506, the observations equations describing the absolute (ground) airspeed of the aircraft are posed, which is indicated along with the final dependencies. Given the measured trajectories of the aircraft i, their absolute speed $v_j^i$ at each position sample $x_j^i$ can be expressed as:

$$v_j^i = \dot{x}_j^i = v_{TAS,j}^i + w_j^i \quad i=1,\ldots,n; \; j=1,\ldots,m_i \tag{5}$$

where $v_{TAS,j}^i$ and $w_j^i$ respectively represent the aircraft speed relative to the wind (true airspeed) and the wind speed at sample j of trajectory i, and $m_i$ is the number of samples available in the observation of trajectory j.

The vector expression in equation (5) represents in fact N scalar equations:

$$N = 3\sum_{i=1}^{n} m_i \tag{6}$$

$v_j^i$ are data coming from trajectory observations, $w_j^i$ can be obtained from the parametric model of equation (3) and $v_{TAS,j}^i$ is a characteristic of the trajectory and the environment, i.e. ultimately depend on the unknown parameters in the aircraft intent and atmospheric conditions, $$v_{TAS,j}^i = f(x_j^i, t_j, z^i, q) \tag{7}$$

The equations (5) give rise to an over-determined fitting problem, which, in general might have a "best solution" as long as the number of equations N is sufficiently greater than the number of unknowns Q+K. Step 508 represents an appropriate method to solve for the unknown parameters $z^i$ and q, for example using an evolutionary algorithm as has been mentioned above.

At 510, once the estimation has been performed, the computer trajectories are compared to the observed trajectories, a fit is obtained and a figure-of-merit (FOM) is computed, e.g. a root mean square deviation that provides a metric on how well the observed trajectories fit to the trajectories calculated by virtue of the inferred intent and atmospheric parameters. Step 512 then checks whether the figure of merit is acceptable. If the figure of merit is not acceptable, the inferred atmospheric conditions and aircraft intent details used as an input to the estimation process are improved at step 514 and the process continues back to step 504. Otherwise, the "best fit" is considered to be achieved and the results are delivered for further processing at step 516.

To demonstrate how atmospheric conditions may be derived from indirect observations of aircraft trajectories, the following example is provided. The example makes use of aircraft trajectories obtained using radar track data available in a conventional terminal maneuvering area environment where airspeeds are likely to fit constant CAS (Calibrated Airspeed) or MACH laws. The example is used to predict atmospheric pressure, temperature and wind as a function of position x and time t:

$$p = f(x,t) \; x = [x_1, x_2, x_3] = f(\lambda, \phi, h) \tag{8}$$

$$T = f(x,t) \tag{9}$$

$$w = f(x,t) \; w = [w_1, w_2, w_3] \tag{10}$$

In a radar environment, the position $x_i$ and speed $v_i$ of aircraft i out of a set of n aircraft (i=1, ... , n) are observed every $\Delta t_S$, which is the track sampling (refresh) time (5 seconds in this example), providing $m_i$ track samples. Thus, assuming a terminal maneuvering area with high traffic density, the amount and dispersion of trajectory samples observed within a certain time window $\Delta t_{obs}$ will be significantly high.

Given the observed trajectory of the aircraft i, the absolute speed $v_j^i$ at each position sample $x_j^i$ can be expressed as:

$$v_j^i = \dot{x}_j^i = v_{TAS,j}^i + w_j^i \quad i=1,\ldots,n; \; j=1,\ldots,m_i \tag{11}$$

where $v_{TAS,j}^i$ and $w_j^i$ respectively represent the aircraft speed relative to the wind (true airspeed) and the wind speed at sample j of trajectory i. In scalar form, the previous expression splits into the following $$N = 3\sum_{i=1}^{n} m_i$$

equations:

$$v_{1,j}^i = v_{TAS,j}^i \cos\gamma_{TAS,j}^i \cos\chi_{TAS,j}^i + w_{1,j}^i$$

$$v_{2,j}^i = v_{TAS,j}^i \cos\gamma_{TAS,j}^i \sin\chi_{TAS,j}^i + w_{2,j}^i$$

$$v_{3,j}^i = v_{TAS,j}^i \sin\gamma_{TAS,j}^i + w_{3,j}^i$$

where $\gamma_{TAS,j}^i$ and $\chi_{TAS,j}^i$ represent the corresponding airspeed pitch and yaw angles respectively.

A reasonable simplifying assumption is followed in that the vertical wind component $w_{3,j}^i$ is neglected since, i) it is always small compared to the horizontal wind components and, ii) any trajectory observations are unlikely to allow its estimation.

Figure 7:
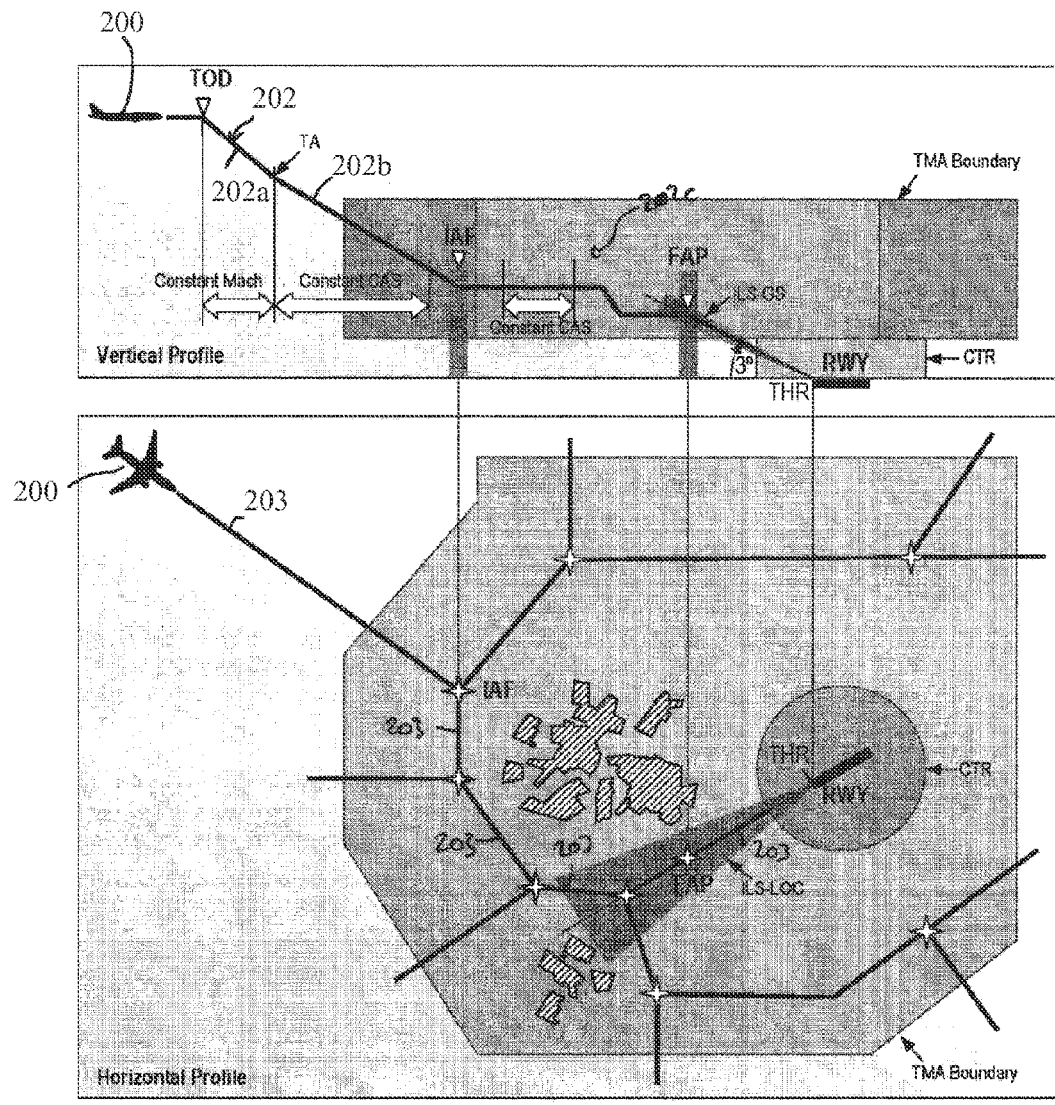
FIG. 7 represents typical vertical and horizontal flight profiles for an aircraft's trajectory arriving at an airport.

FIG. 7 shows the typical vertical profile and horizontal profile of a trajectory of an aircraft flying an arrival (e.g. a STAR) into an airport. In today's operational context, the combination of air traffic control procedures like STARs and typical airborne equipment (flight management systems) results in many arrival/approach trajectories exhibiting a common speed profile (i.e. a part of the aircraft intent) that consists of:

1) a first segment 202a holding constant Mach till reaching the so-called transition altitude (TA), which is computed by the flight management system so as to optimise flight efficiency (based on user defined cost-index);
2) then flying a second leg 202b holding a corresponding calibrated airspeed (CAS) for almost the remaining part of the descent until terminal maneuvering area procedures or given air traffic control constraints make necessary vertical and/or speed maneuvers that terminate the Mach/CAS speed schedule designed by the flight management system; and
3) eventually, flying additional trajectory segments 202c performed again at constant (but lower) CAS while the aircraft proceeds through standard arrival routes (STARs) within the terminal maneuvering area or is vectored by air traffic control.

As far as standard instrument departure (SID) trajectories are concerned, conversely the speed profile flown by a large number of flight management system-equipped aircraft typically consists of an optimal Mach/CAS climb designed by the flight management system, where air traffic control interventions that result in altitude or speed constraints are less likely. These well-defined STAR and SID profiles assist in defining likely aircraft intent with a good degree of confidence.

The relationship between $v_{TAS}$ and $v_{CAS}$ and Mach (M) and $v_{TAS}$, involves atmospheric properties, as follows:

$$v_{TAS} = \sqrt{\frac{2\kappa}{\kappa-1}\frac{p}{\rho}\left\{\left[1+\frac{p_0}{p}\left[\left(1+\frac{\kappa-1}{2\kappa}\frac{\rho_0}{p_0}v_{CAS}^2\right)^{\frac{\kappa}{\kappa-1}}-1\right]\right]^{\frac{\kappa-1}{\kappa}}-1\right\}} \quad (13)$$

$$v_{CAS} = \sqrt{\frac{2\kappa}{\kappa-1}\frac{p_0}{\rho_0}\left\{\left[1+\frac{p}{p_0}\left[\left(1+\frac{\kappa-1}{2\kappa}\frac{\rho}{p}v_{TAS}^2\right)^{\frac{\kappa}{\kappa-1}}-1\right]\right]^{\frac{\kappa-1}{\kappa}}-1\right\}} \quad (14)$$

$$M = \frac{v_{TAS}}{a} \quad (15)$$

$$a = \sqrt{\kappa\frac{p}{\rho}} \quad (16)$$

where: a is the speed of sound;
p, ρ, $p_0$ and $\rho_0$ are local pressure and density and the corresponding International Standard Atmosphere (ISA) pressure and density defined at the standard mean sea level (MSL) respectively; and
κ is the air adiabatic index.

In functional terms, it can be stated that $$v_{TAS} = f(v_{CAS}, p, T) \quad (17)$$

$$v_{TAS} = f(M, p, T) \quad (18)$$

Using the ISA convention to relate altitude h and given atmospheric conditions $p_{MSL}$ and $T_{MSL}$ at the MSL point below the vertical of the local position $$p = f(h, p_{MSL}, T_{MSL}) \quad (19)$$

$$T = f(h, p_{MSL}, T_{MSL}) \quad (20)$$

The transition altitude $h_{TA}$ is defined as the altitude at which the $v_{TAS}$ corresponding to the Mach selected according to equation (15) equals the altitude corresponding to the CAS selected according to equation (13) above, $$h_{TA} = f(v_{CAS}, M, T_{MSL}) \quad (21)$$

Once the ISA model is adopted, in formal terms, the 4D atmospheric model to be inferred would provide the distribution of $p_{MSL}$ and $T_{MSL}$ throughout the Earth surface's area of interest, as well as the local wind as a function of position, time and a set of Q parameters $\{q_1, q_2, \ldots, q_Q\}$ as $$p_{MSL} = f(\lambda, \phi, t, q_1, q_2, \ldots, q_Q) \quad (22)$$

$$T_{MSL} = f(\lambda, \phi, t, q_1, q_2, \ldots, q_Q) \quad (23)$$

$$w_1 = f(\lambda, \phi, t, q_1, q_2, \ldots, q_Q) \quad (24)$$

$$w_2 = f(\lambda, \phi, t, q_1, q_2, \ldots, q_Q) \quad (25)$$

$$w_3 = 0 \quad (26)$$

The pressure, temperature and wind fields described above may be chosen to conform to a simplified fluid dynamic model of the atmosphere (e.g. hydrostatic in the vertical direction, with an absence of viscosity). This provides additional conditions that may be used as part of the parametric 4D atmospheric model identification process.

Now, dividing a trajectory into r and s trajectory segments, with the r segments being the number of segments executed at constant Mach and the s segments being the number of segments executed at constant CAS, a subset of the trajectory samples considered in equations (12) can be reformulated as $$v_{1,j}^i = v_{TAS}(M^i, x_j^i, t_j^i, q_1, q_2, \ldots, q_Q)\cos \gamma_{TAS,j}^i \cos \chi_{TAS,j}^i + w_1 = (x_j^i, t_j^i, q_1, q_2, \ldots, q_Q)$$

$$v_{2,j}^i = v_{TAS}(M^i, x_j^i, t_j^i, q_1, q_2, \ldots, q_Q)\cos \gamma_{TAS,j}^i \sin \chi_{TAS,j}^i + w_2 = (x_j^i, t_j^i, q_1, q_2, \ldots, q_Q)$$

$$v_{3,j}^i = v_{TAS}(M^i, x_j^i, t_j^i, q_1, q_2, \ldots, q_Q)\sin \gamma_{TAS,j}^i \quad i=1,\ldots,r; j=1,\ldots,m_i \quad (27)$$

$$v_{1,j}^i = v_{TAS}(v_{CAS}^i, x_j^i, t_j^i, q_1, q_2, \ldots, q_Q)\cos \gamma_{TAS,j}^i \cos \chi_{TAS,j}^i + w_1 = (x_j^i, t_j^i, q_1, q_2, \ldots, q_Q)$$

$$v_{2,j}^i = v_{TAS}(v_{CAS}^i, x_j^i, t_j^i, q_1, q_2, \ldots, q_Q)\cos \gamma_{TAS,j}^i \sin \chi_{TAS,j}^i + w_2 = (x_j^i, t_j^i, q_1, q_2, \ldots, q_Q)$$

$$v_{3,j}^i = v_{TAS}(v_{CAS}^i, x_j^i, t_j^i, q_1, q_2, \ldots, q_Q)\sin \gamma_{TAS,j}^i \quad i=1,\ldots,r; j=1,\ldots,m_i \quad (28)$$

where the unknowns are indicated in the table immediately below.

| Unknown variable | Description | Cardinality index |
|---|---|---|
| $M^i$ | Mach held along the trajectory segment | r |
| $v_{CAS}^i$ | CAS held along the trajectory segment | s |
| $\gamma_{TAS,j}^i$ | Instantaneous airspeed pitch angle | $T = \sum_{i=1}^{r} m_i + \sum_{i=1}^{s} m_i$ |
| $\chi_{TAS,j}^i$ | Instantaneous airspeed yaw angle | $T = \sum_{i=1}^{r} m_i + \sum_{i=1}^{s} m_i$ |
| $\{q_1, q_2, \ldots, q_Q\}$ | Parameters of the 4D atmosphere model | Q |

This gives rise to a non-linear identification problem characterized by r+s+2T+Q unknowns. A number of 3T observation equations will be available along with a certain framework of conditions that the Q $q_k$ parameters must meet in order to conform to the physical formulation of the 4D atmospheric model adopted.

Typical figures for the cardinality indexes introduced can be estimated as indicated in the table immediately below.

| Parameter | Estimated Value | Description/Rationale |
|---|---|---|
| $\Delta t_{obs}$ | 20 min (1,200 s) | Typical descent time |
| $\Delta t_s$ | 5 s | Typical radar track refresh time |
| N | 30 | Reasonable number of aircraft participating in the identification process, 80% of which performed CAS/Mach speed schedules |
| r + s | 0.8 × N = 24 | Number of CAS or Mach trajectory segments indentified |
| $T = \frac{(r+s)\Delta t_{obs}}{\Delta t_s}$ | 5,760 | Number of radar track samples considered |
| 3T | 17,280 | Number of scalar observation equations |
| Q = 3T − (r + s + 2T) = T − (r + s) | 5,736 | Maximum number of atmosphere and intent parameters identifiable in case no redundancy of observations is considered |

As shown, the approach of deriving atmosphere properties from radar track data leads to a non-linear multivariate identification problem, which is comfortably over-determined as long as the number of 4D atmosphere model parameters (Q) is chosen to be lower enough than T−(r+s), that is the number of radar track samples considered less the number of segments per track.

Those skilled in the art will appreciate that variations may be made to the above embodiments without departing from the scope of the disclosure that is defined by the appended claims.

The invention claimed is:

1. A computer-implemented method of providing data relating to atmospheric conditions in an airspace using observations of aircraft trajectories through the airspace, the method comprising a computer system:
 (a) identifying aircraft flying within the airspace;
 (b) for at least some of the aircraft identified, processing the aircraft by
   determining an observed trajectory of the aircraft,
   determining initial conditions of the aircraft,
   determining the type of the aircraft and retrieving from memory aircraft
   performance data relating to that type of aircraft, and
   retrieving from memory aircraft intent data relating to the aircraft stored therein, wherein the aircraft intent data provides an unambiguous description of the aircraft's trajectory through the airspace expressed using a formal language;
 (c) using as inputs the observed trajectories, the initial conditions, the aircraft performance data, and the aircraft intent data for the processed aircraft;
 (d) inferring from the inputs atmospheric conditions data that, in combination with the aircraft intent data and the aircraft performance data, would give rise to the observed trajectory for each of the processed aircraft; and
 (e) providing as an output the inferred atmospheric conditions data for the airspace.

2. The method of claim 1, further comprising the computer system:
 (f) calculating from the inferred atmospheric conditions data, the aircraft intent data and the aircraft performance data, a calculated trajectory for each of the processed aircraft;
 (g) comparing the calculated trajectory to the observed trajectory for each processed aircraft and determining those processed aircraft with calculated trajectories that match the observed trajectories within a predetermined threshold;
 (h) discarding the observed trajectories, the aircraft intent data and the aircraft performance data for each processed aircraft with a calculated trajectory that does not match its observed trajectory within the predetermined threshold while retaining the observed trajectories, the aircraft intent data and the aircraft performance data for each processed aircraft with a calculated trajectory that matches its observed trajectory within the predetermined threshold;
 (i) determining from the observed trajectories, the initial conditions, the aircraft performance data, and the aircraft intent data for the retained aircraft, the atmospheric conditions data that, in combination with the aircraft intent data and the aircraft performance data, would give rise to the observed trajectory for each retained aircraft.

3. The method of claim 2, further comprising the computer system:
 in step (g), further calculating an overall measure of how well the calculated trajectories match the observed trajectories.

4. The method of claim 3, further comprising the computer:
 performing steps (h) and (i) based upon the overall measure.

5. The method of claim 3 further comprising the computer system:
 (j) for each aircraft, comparing the trajectory calculated at step (i) to the observed trajectory, and further calculating an overall measure of how well the calculated trajectories at step (i) match the observed trajectories; and wherein providing as an output the calculated atmospheric conditions data in the airspace in step (e) comprises providing the atmospheric conditions data with the better overall measure determined in steps (g) and (j).

6. A computer-implemented method of providing data relating to atmospheric conditions in an airspace and aircraft intent of aircraft flying through the airspace using observations of the aircraft trajectories through the airspace, the method comprising a computer system:
 (i) identifying aircraft flying within the airspace;
 (ii) for at least some of the aircraft identified, processing the aircraft by
   determining a trajectory of the aircraft,
   determining initial conditions of the aircraft,
   determining the type of the aircraft and
   retrieving from memory aircraft performance data relating to that type of aircraft, and
   retrieving from memory any filed aircraft intent data relating to the aircraft stored therein,
   wherein the aircraft intent data provides an unambiguous description of the aircraft's trajectory through the airspace expressed in a formal language;
 (iii) using as inputs the trajectories, the initial conditions, the filed aircraft intent data, and the aircraft performance data for the processed aircraft;
 (iv) inferring from the inputs the atmospheric conditions data and missing aircraft intent data that, in combination with the filed aircraft intent data and the aircraft performance data, would give rise to the determined trajectory for each processed aircraft; and
 (v) providing as an output data corresponding to the description of the atmospheric conditions for the airspace and, optionally, the missing aircraft intent data.

7. The method of claim 6, comprising the computer system:
 in step (iii), for processed aircraft not having filed aircraft intent data stored in the memory, comparing the observed trajectory of that aircraft with reference trajectories and/or profiles to identify a match between trajectories and/or profiles, and
 if a match is found, generating the missing aircraft intent data from a template associated with the matching reference trajectory and/or profile such that the processed aircraft is retained,
 or
 if no match is found, discarding the observed trajectory, the filed aircraft intent data and the aircraft performance data for that processed aircraft such that the processed aircraft is discarded; and
then using as inputs the trajectories, the initial conditions, combined aircraft intent data including the filed aircraft intent data and the generated missing aircraft intent data, and the aircraft performance data for the retained aircraft to determine the atmospheric conditions data that, in combination with the combined aircraft intent data and the aircraft performance data, would give rise to the determined trajectory for each retained aircraft.

8. The method of claim 7, further comprising the computer system:
(vi) calculating from the inferred atmospheric conditions data, the combined aircraft intent data and the aircraft performance data, a calculated trajectory for each retained aircraft;
(vii) comparing the calculated trajectory to the observed trajectory for each retained aircraft and determining those retained aircraft with calculated trajectories that match the observed trajectories within a first predetermined threshold;
(viii) discarding the observed trajectories, the aircraft intent data and the aircraft performance data for each formerly retained aircraft with a calculated trajectory that does not match its observed trajectory within the predetermined first threshold while retaining the observed trajectories, the aircraft intent data and the aircraft performance data for each aircraft with a calculated trajectory that matches its observed trajectory within the first predetermined threshold; and
(ix) determining from the observed trajectories, the initial conditions, the aircraft performance data, and the combined aircraft intent data for the twice retained aircraft, the atmospheric conditions data that, in combination with the combined aircraft intent data and the aircraft performance data, would give rise to the observed trajectory for each twice retained aircraft.

9. The method of claim 7, further comprising the computer system:
(vi) calculating from the inferred atmospheric conditions data, the combined aircraft intent data and the aircraft performance data, a calculated trajectory for each retained aircraft;
(vii) comparing the calculated trajectory to the observed trajectory for each retained aircraft and determining those retained aircraft with calculated trajectories that match the observed trajectories within a first predetermined threshold and within a second predetermined threshold;
(viii) discarding the observed trajectories, the aircraft intent data and the aircraft performance data for each formerly retained aircraft with a calculated trajectory that does not match its observed trajectory within the predetermined first threshold with those aircraft becoming discarded aircraft, amending the missing aircraft intent data and retaining the observed trajectories and the aircraft performance data of each retained aircraft with a calculated trajectory that matches its observed trajectory within the predetermined first threshold but does not match its observed trajectory within the predetermined second threshold with those aircraft becoming twice retained aircraft, and retaining the observed trajectories, the aircraft intent data and the aircraft performance data for each retained aircraft with a calculated trajectory that matches its observed trajectory within the first and second predetermined thresholds with those aircraft becoming twice retained aircraft, and
(ix) determining from the observed trajectories, the initial conditions, the aircraft performance data, and the combined aircraft intent data for the twice retained aircraft, the atmospheric conditions data that, in combination with the combined aircraft intent data and the aircraft performance data, would give rise to the observed trajectory for each twice retained aircraft.

10. The method of claim 8 further comprising the computer system:
in step (vii), further calculating an overall measure of how well the calculated trajectories match the observed trajectories.

11. The method of claim 10, further comprising the computer system: performing steps (viii) and (ix) based upon the overall measure.

12. The method of claim 10 further comprising the computer system:
(x) for each twice retained aircraft, comparing the trajectory calculated at step (ix) to the observed trajectory, and further calculating an overall measure of how well the calculated trajectories at step (ix) match the observed trajectories; and
wherein providing as an output the calculated atmospheric conditions data in the airspace and optionally the missing aircraft intent data comprises providing the atmospheric conditions data and optionally the missing aircraft intent data with the better overall measure determined in steps (vii) and (ix).

13. The method of claim 7 wherein at least one reference trajectory and associated template describes a standard instrument departure or a standard terminal arrival.

14. The method of claim 6 further comprising, if there is missing aircraft intent data, the computer system retrieving from memory any filed flight intent data relating to that aircraft stored therein and using the flight intent data when generating the missing aircraft intent data.

15. A system for providing data relating to atmospheric conditions in an airspace using observations of aircraft trajectories through the airspace, the system comprising:
a computer system;
a memory having stored therein computer program instructions that, when executed, cause the computer system to:
(a) identify aircraft flying within the airspace;
(b) for at least some of the aircraft identified, process the aircraft by
determining an observed trajectory of the aircraft,
determining initial conditions of the aircraft,
determining the type of the aircraft and retrieving from memory aircraft performance data relating to that type of aircraft, and
retrieving from memory aircraft intent data relating to the aircraft stored therein, wherein the aircraft intent data provides an unambiguous description of the aircraft's trajectory through the airspace expressed using a formal language;
(c) use as inputs the observed trajectories, the initial conditions, the aircraft performance data, and the aircraft intent data for the processed aircraft;
(d) infer from the inputs atmospheric conditions data that, in combination with the aircraft intent data and the aircraft performance data, would give rise to the observed trajectory for each of the processed aircraft; and
(e) provide as an output the inferred atmospheric conditions data for the airspace.

16. The system of claim 15, further comprising computer program instructions that, when executed, cause the computer system to:

(f) calculate from the inferred atmospheric conditions data, the aircraft intent data and the aircraft performance data, a calculated trajectory for each of the processed aircraft;

(g) compare the calculated trajectory to the observed trajectory for each processed aircraft and determine those processed aircraft with calculated trajectories that match the observed trajectories within a predetermined threshold;

(h) discard the observed trajectories, the aircraft intent data and the aircraft performance data for each processed aircraft with a calculated trajectory that does not match its observed trajectory within the predetermined threshold while retaining the observed trajectories, the aircraft intent data and the aircraft performance data for each processed aircraft with a calculated trajectory that matches its observed trajectory within the predetermined threshold;

(i) determine from the observed trajectories, the initial conditions, the aircraft performance data, and the aircraft intent data for the retained aircraft, the atmospheric conditions data that, in combination with the aircraft intent data and the aircraft performance data, would give rise to the observed trajectory for each retained aircraft.

17. The system of claim 16, further comprising computer program instructions that, when executed, cause the computer system to:

in step (g), further calculate an overall measure of how well the calculated trajectories match the observed trajectories.

18. The system of claim 17, further comprising computer program instructions that, when executed, cause the computer system to:

perform steps (h) and (i) based upon the overall measure.

19. The system of claim 17 further comprising computer program instructions that, when executed, cause the computer system to:

(j) for each aircraft, compare the trajectory calculated at step (i) to the observed trajectory, and further calculate an overall measure of how well the calculated trajectories at step (i) match the observed trajectories; and wherein providing as an output the calculated atmospheric conditions data in the airspace in step (e) comprises providing the atmospheric conditions data with the better overall measure determined in steps (g) and (j).

20. A non-transitory computer readable medium comprising instructions that, when executed, cause a computer system to:

(a) identify aircraft flying within the airspace;

(b) for at least some of the aircraft identified, process the aircraft by determining an observed trajectory of the aircraft, determining initial conditions of the aircraft, determining the type of the aircraft and retrieving from memory aircraft performance data relating to that type of aircraft, and retrieving from memory aircraft intent data relating to the aircraft stored therein, wherein the aircraft intent data provides an unambiguous description of the aircraft's trajectory through the airspace expressed using a formal language;

(c) use as inputs the observed trajectories, the initial conditions, the aircraft performance data, and the aircraft intent data for the processed aircraft;

(d) infer from the inputs atmospheric conditions data that, in combination with the aircraft intent data and the aircraft performance data, would give rise to the observed trajectory for each of the processed aircraft; and (e) provide as an output the inferred atmospheric conditions data for the airspace.

\* \* \* \* \*